US007009320B2

(12) United States Patent
Akita et al.

(10) Patent No.: US 7,009,320 B2
(45) Date of Patent: Mar. 7, 2006

(54) STATOR OF ELECTRIC ROTATING MACHINE

(75) Inventors: Hiroyuki Akita, Tokyo (JP); Yoshito Asao, Tokyo (JP); Haruyuki Kometani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/083,096

(22) Filed: Mar. 18, 2005

(65) Prior Publication Data

US 2005/0212372 A1 Sep. 29, 2005

(30) Foreign Application Priority Data

Mar. 29, 2004 (JP) ............................ 2004-093973

(51) Int. Cl.
*H02K 1/00* (2006.01)

(52) U.S. Cl. ....................... 310/179; 310/184; 310/187

(58) Field of Classification Search ........ 310/179–180, 310/184, 189, 194, 200, 202, 203, 214–218, 310/254, 259, 260

See application file for complete search history.

(56) References Cited

U.S. PATENT DOCUMENTS 3,408,517 A * 10/1968 Willyoung .................. 310/198
3,652,688 A * 3/1972 Harrington .................. 310/198
4,144,470 A * 3/1979 Auinger ...................... 310/198
4,409,507 A * 10/1983 Godwin ...................... 310/205
5,898,251 A 4/1999 Mochizuki et al.
6,373,163 B1 4/2002 Oohashi et al.
6,570,290 B1 * 5/2003 Kazmierczak .............. 310/184
2002/0113515 A1 8/2002 Umeda

FOREIGN PATENT DOCUMENTS

JP 2002-291187 10/2002
WO WO 94/07296 3/1994

* cited by examiner

*Primary Examiner*—Thanh Lam
(74) *Attorney, Agent, or Firm*—Leydig, Voit & Mayer, Ltd.

(57) ABSTRACT

A stator of a wire connection structure is capable of producing an unlimited number of non-integer turns. This stator is made by turning back first to sixth conductors on the outside of an end face of a stator iron core, and by mounting them in slots at a predetermined slot pitch in each of U, V and W phases. The sixth conductor is divided into two 0.5 turns coils. Connecting in parallel 1.5 turns of each coil, in which the second conductor and a first of the coils are connected, and 1.5 turns of a coil in which the fourth conductor and a second of the coils are connected, forms a 1.5 turns coil. Connecting in series the 1.5 turns coil, and 3 turns of a coil formed by connecting in series the first conductor, the third conductor, and the fifth conductor forms a 4.5 turns coil.

7 Claims, 9 Drawing Sheets

STATOR OF ELECTRIC ROTATING MACHINE

BACKGROUND OF THE INVENTION

1. Field of the Invention

The present invention relates to a stator for use in an electric rotating machine such as motor or generator and, more particularly, to a wire connection structure in distributed winding structure of coils being regularly wound.

2. Description of the Related Art

Generally a stator of an electric rotating machine includes a stator iron core, coils mounted onto the stator iron core, and insulators that are mounted onto slots and serve to insulate the coils from the stator iron core.

For example, one of conventional stator iron cores is a cylindrical member formed by laminating thin steel plates, and in which a plurality of slots extending in a direction of central axis are circumferentially disposed at a predetermined pitch so as to be open to the inner circumferential side. To facilitate mounting of coils, a stator iron core formed into a strip has been proposed, in which a gap of the slots is made larger than a line width of a coil conductor, thereby enabling to mount a conductor having a large line width on the stator iron core. In such a stator iron core, two ends of the strip-shaped stator iron core are brought in butt to be annular after having mounted the coils, and both ends are jointed by, e.g., welding.

As for the configuration of coils, a structure, in which coil ends of a conductor for use in coil are turned back to be wave-wound on the outside of an axial end face of the stator iron core, has been proposed. To efficiently use a space of slots, another structure has been also proposed, in which two sets of coils are mounted at intervals of a predetermined number of slots so that a conductor of a set of two lines runs in an inner layer and outer layer of a depth direction of the slots alternately, and these coils are distributed—wound into six phases (for example, see the Japanese Patent Publication (unexamined) No. 211584/2002 (on pages 5–8, FIGS. 2–6).

The number of turns of a coil has a great effect on performance of an electric rotating machine. Supposing that the number of turns is limited, a performance design appropriate for various uses cannot be done.

For example, in the case of employing an electric rotating machine in an AC generator of an automobile, taking notice of the relation between an output current of the generator and an engine speed of an engine proportional to the number of revolutions of a rotor, it is acknowledged that, in an electric generator of a larger number of turns of coil, an output current at low speed becomes lower while an output current at high speed becomes higher, as compared with an electric generator of a smaller number of turns of coil. It is certain that there are various needs in view of the balance in output current between at low speed and at high speed. But as the number of coils in a slot is specified and the number of turns of coil is an integer, thus resulting in a problem of occurring some cases not satisfying the above-mentioned needs.

As a solution to such a problem, a construction in which Δ-connection of an integral number of turns of coils and Y-connection of an integral number of turns of coils are combined has been proposed. In this construction, out of two sets of three-phase coils of integral turns, one set of three-phase coil is Δ-connected, and the other set of three-phase coil is connected to connection points of the Δ-connection. Thus, two sets of the three-phase coils are located at slot positions, which is in a state of being shifted by $\pi/6$ electrical angle to each other.

With this construction, even if the number of turns of two sets of three-phase coils is integers, the number of turns in the wire connection state of the Δ-connection and Y-connection can be the number of turns between integers (non-integral turn number) (for example, see the Japanese Patent Publication (unexamined) No, 247787/2002 (on pages 4–5, FIGS. 2–5).

However, in the construction of the mentioned Japanese Patent Publication (unexamined) No. 247787/2002, a problem exists in that two sets of three-phase coils are needed. Moreover, another problem exists in that since respective turn numbers of two sets of three-phase coils are set to be integers, the number of non-integral turns in the wire connection state of the Δ-connection and Y-connection cannot be obtained unlimitedly.

SUMMARY OF THE INVENTION

The present invention was made to solve the problems as mentioned above, and has an object of providing a stator of a wire connection structure enabling to obtain a non-integral number of turns unlimitedly.

A stator of an electric rotating machine according to the present invention includes: a stator iron core having a plurality of slots that extend in an axial direction of an annular member formed by laminating thin steel plates and that are disposed at a determined pitch circumferentially; and coils forming U-phase, V-phase and W-phase. In this stator, a coil of each of said phases is formed by turning back n conductors on the outside of an end face of the mentioned stator iron core, and mounting the n conductors onto the mentioned slots at a predetermined slot pitch. The number of slots in each of said phases is established to be S, and in each of said phases, plural sets of m conductors are selected out of $(S\cdot n)$ conductors in all of the slots and connected in series. Further, the mentioned plural sets of conductors are connected in parallel thereby forming a non-integral m/S turns of coil; and a non-integral number of turns of coil is formed by combining the mentioned non-integral m/S turns of coil with an integral number of turns of coils composed of conductors not selected.

In the above-mentioned stator of an electric rotating machine according to the invention, for constructing the wire connection structure of non-integral turn number, the freedom in designing non-integral turn number is improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 10:
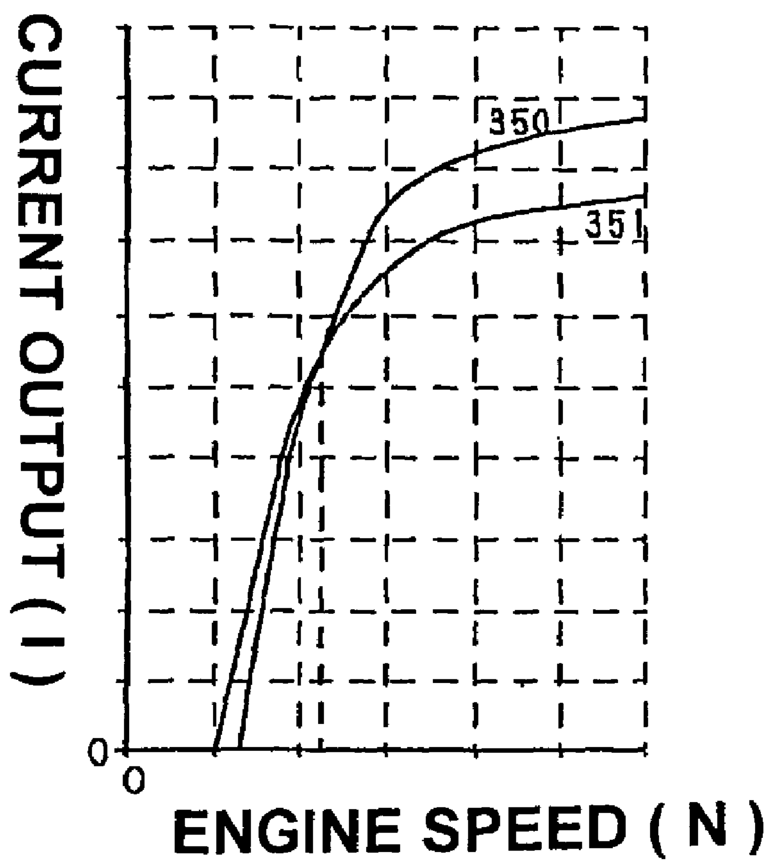
FIG. 10 is a graphic diagram indicating the relation between engine speed and current output.

As described above, in the case of employing an electric rotating machine in an AC generator of an automobile and the like, taking notice of the relation between an output current (I) of the generator and an engine speed (N) of an engine proportional to the number of revolutions of a rotor, it is acknowledged that, as shown in FIG. 10, in an electric generator with a coil 350 of a larger number of turns, an output current at low speed becomes lower while an output current at high speed becomes higher than those of a coil 351 of a smaller number of turns. It is certain that there are various needs in view of the balance in output current (I) between at low speed and at high speed. To meet these needs, it is necessary to increase freedom in designing the number of turns of coil. This invention provides a wire connection structure enabling to obtain an unlimited non-integral number of turns so as to satisfy the various needs for the balance in output currents (I) between at low speed and at high speed.

Referring now to the accompanying drawings, several preferred embodiments according to the invention are hereinafter described.

Embodiment 1

Figure 1:
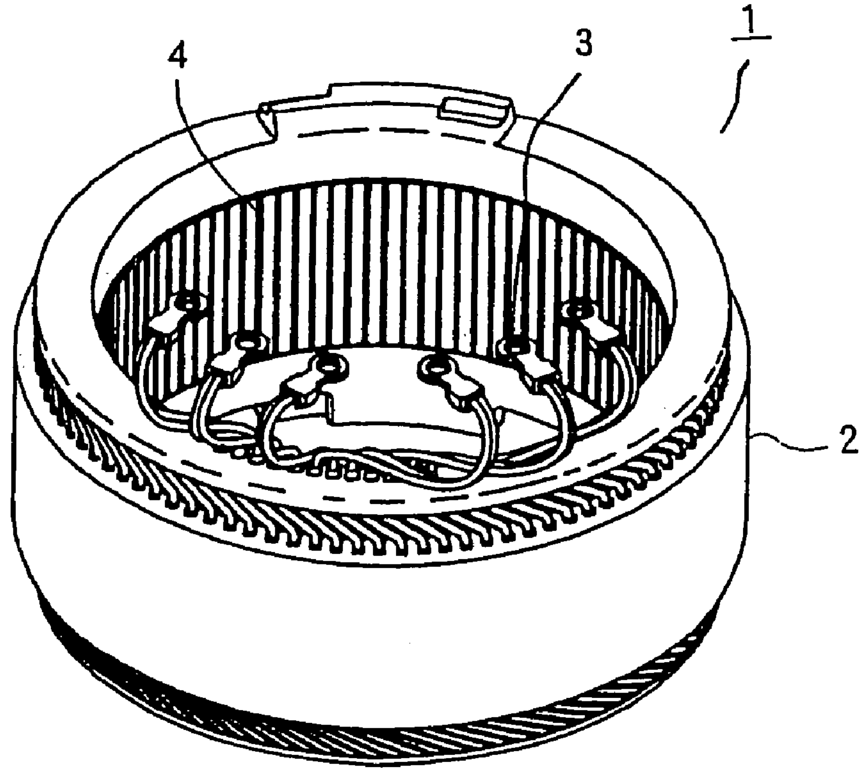
FIG. 1 is a perspective view showing construction of a first preferred embodiment of a stator of an electric rotating machine according to the present invention.

FIG. 1 is a perspective view showing construction of a stator of an electric rotating machine according to a first embodiment of the invention.

With reference to this FIG. 1, a stator 1 comprises a stator iron core 2 formed by laminating thin steel plates, and coils mounted into a plurality of slots 4 that are disposed at a predetermined pitch circumferentially so as to be open toward the inner circumferential side of the stator iron core 2, and that extend in a direction of central axis.

Figure 2:
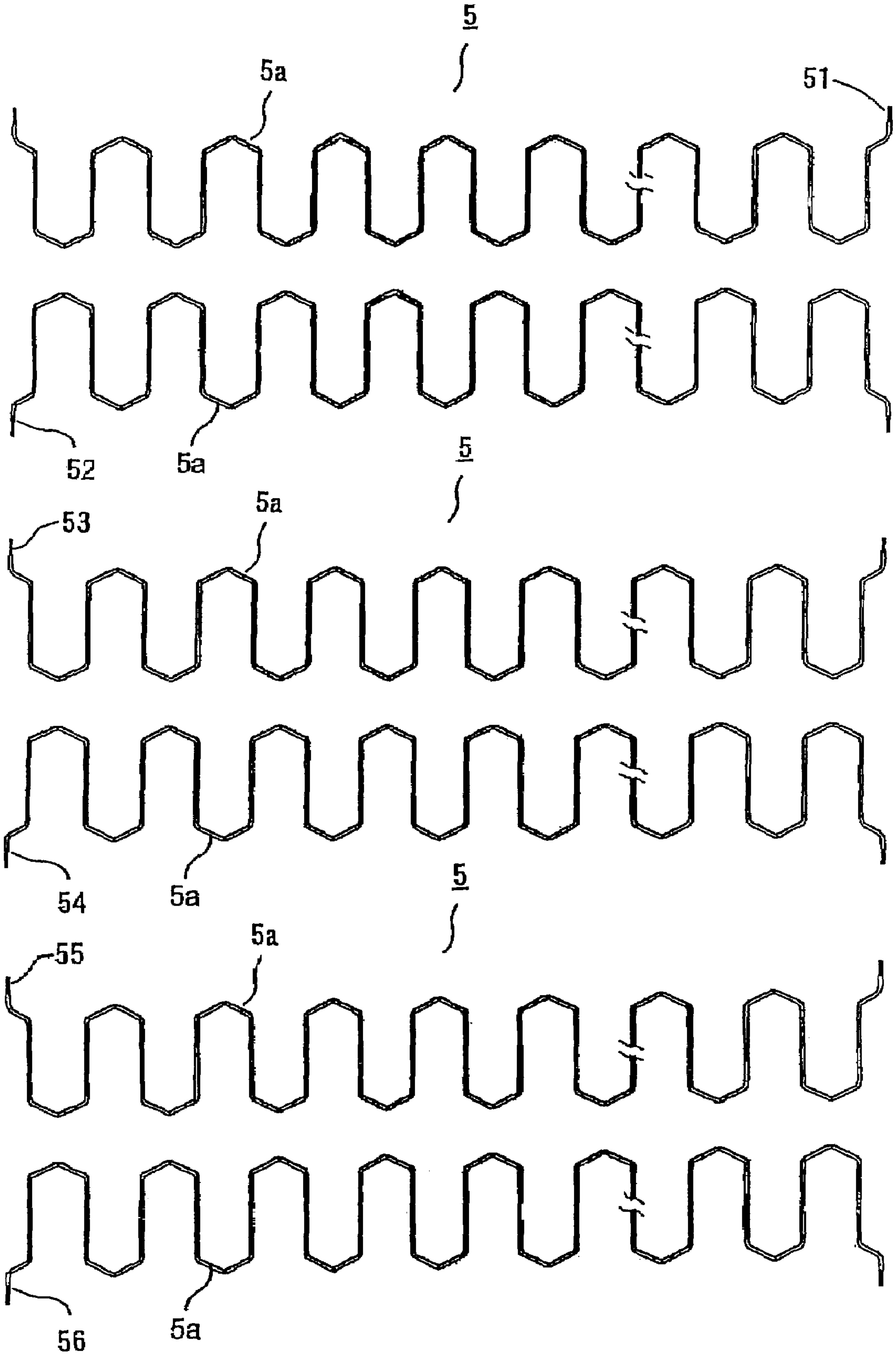
FIG. 2 is a plan view showing shapes of coils.

FIG. 2 is a plan view showing shapes of coils. As shown in this FIG. 2, a coil 5 is structured such that coil ends 5*a* thereof are turned back on the outside of an axial end face of the stator iron core (end portion of lines standing upright in a vertical direction of page space) to be wave-wound. A first conductor 51 and second conductor 52, a third conductor 53 and fourth conductor 54, and a fifth conductor 55 and sixth conductor 56 are mounted in slots forming three pairs respectively.

Figure 3:
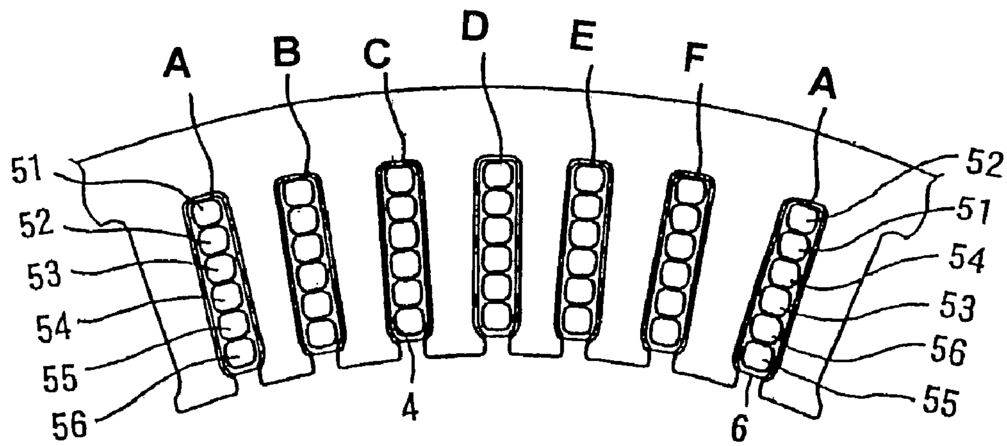
FIG. 3 is a cross sectional view showing a state in which plural sets of coils are mounted onto slots.

FIG. 3 is a cross sectional view showing a state in which plural pairs of conductors are mounted onto slots. As shown in FIG. 3, one pair of the first conductor 51 and the second conductor 52 are mounted at a predetermined slot pitch so as to be run on the inner layer side and outer layer side of a depth direction of the slot 4 (the first slot is followed by the seventh slot in the drawing) in order to efficiently use a space. The other pairs of the third conductor 53 and fourth conductor 54, and the fifth conductor 55 and sixth conductor 56 are likewise mounted at a predetermined slot pitch so as to run on the inner layer side and the outer layer side alternately thus forming a coil A. Furthermore, in the same manner, conductors of the remaining five phases of coils B, C, D, E and F are mounted at a predetermined slot pitch. Herein, the coils a and d are taken as U-phase, the coils B and E are taken as V-phase, and the coils c and f are taken as W-phase.

As described above, the elongated conductors are turned back on the outside of an end face of the stator iron core, and coils are mounted onto the slots at a predetermined slot pitch, thereby enabling the so-called array winding in which coil ends are arrayed.

Figure 4:
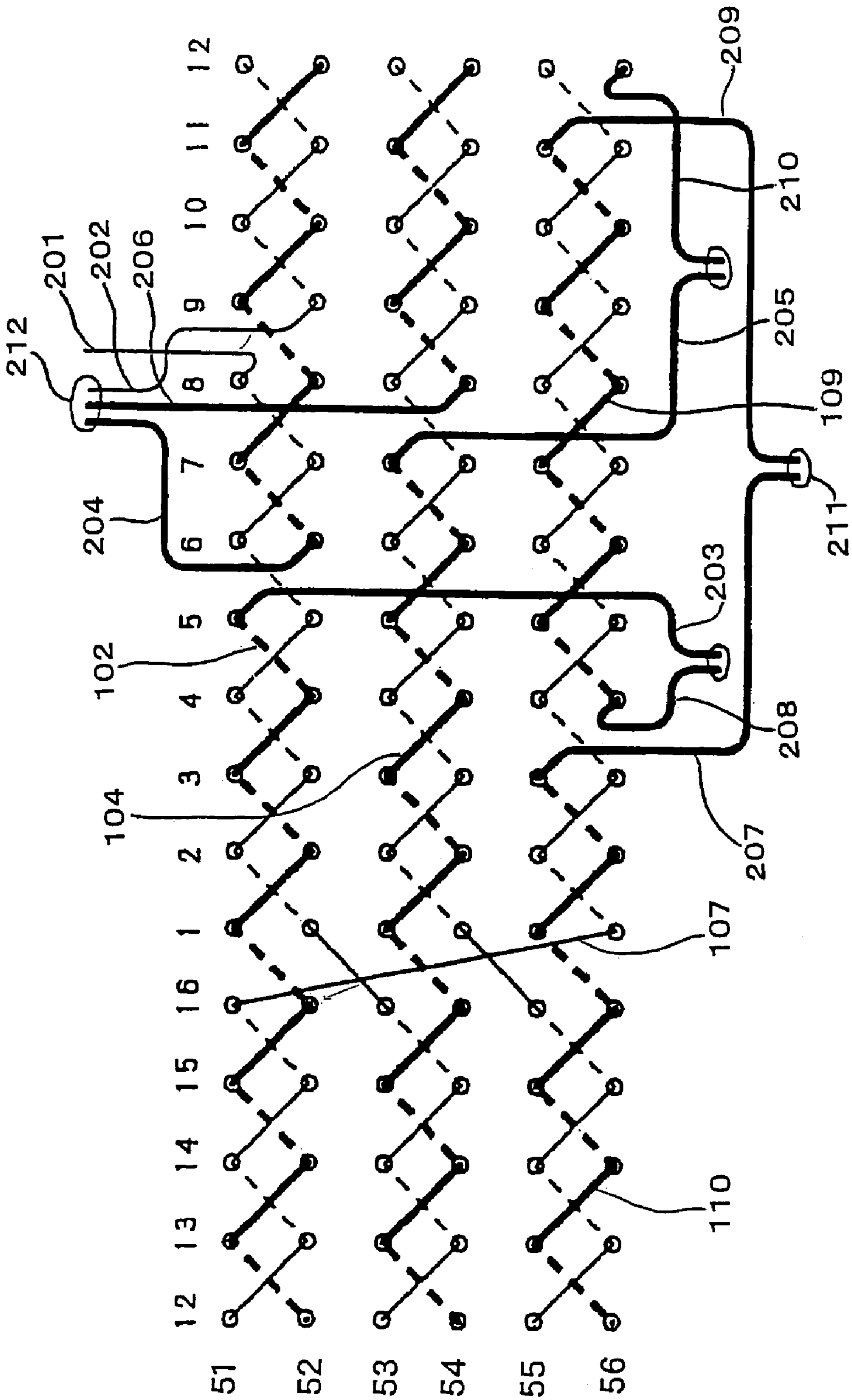
FIG. 4 is a wire connection diagram for explaining a wire connection in wiring according to the first embodiment of the invention.

FIG. 4 is a schematic connection diagram for explaining the wire connection of a coil A in the first embodiment according to the invention. In the drawing, circles show conductors disposed in slots (lines standing upright in a vertical direction of the page space in FIG. 2); solid lines provide a connection between the circles show coil ends at one end of the stator iron core; broken lines provide a connection between the circles show coil ends at the other end of the stator iron core; and circles located in a longitudinally identical row show that they are mounted in the same slot. Numerals indicated above the circles are the ones that are numbered in sequence with respect to mounting slots in the case of noting one phase of the coil A. Although not shown, the other five phases of conductors are present between the circles in a lateral direction, and there are a total number of 96 slots.

As shown in FIG. 4, one phase (U phase) of coil A consists of three pairs of the first conductor 51 and second conductor 52, the third conductor 53 and fourth conductor 54, and the fifth conductor 55 and sixth conductor 56. Out of these conductors, the first conductor 51, the third conductor 53, and the fifth conductor 55 are connected in series at terminals of the first slot and the sixteenth slot; and lead wires 201 and 202 are disposed at a coil end between the eighth slot and the ninth slot of the first conductor 51 to form 3 turns of coil 107.

The second conductor 52, the fourth conductor 54 and the sixth conductor 56 are connected at terminals of the first slot and the sixteenth slot respectively. Further, a lead wire 203 and a lead wire 204 are disposed at a coil end between the fifth slot and the sixth slot of the second conductor 52; a lead wire 205 and a lead wire 206 are disposed at a coil end between the seventh slot and the eight slot of the fourth conductor 54; a lead wire 207 and a lead wire 208 are disposed at a coil end between the third slot and the fourth slot of the sixth conductor 56; and a lead wire 209 and a lead wire 210 are disposed at a coil end between the eleventh slot and the twelfth slot of the sixth conductor 56.

The disposition of these lead wires forms 1 turn of coil 102 from the lead wire 203 to the lead wire 204, and 1 turn of coil 104 from the lead wire 205 to the lead wire 206. Furthermore, due to the fact that lead wires come out from two points of the sixth wiring 56, the sixth wiring 56 id divided into a group of 0.5 turn of coil 109 from the lead wire 208 to the lead wire 209 and a group of 0.5 turn of coil 110 from the lead wire 210 to the lead wire 207.

By the connection of the lead wire 208 and the lead wire 203, the coil 102 and the coil 109 are connected in series to form 1.5 turns of coil. Furthermore, by the connection of the lead wire 210 and the lead wire 205, the coil 104 and the coil 110 are connected in series to form 1.5 turns of coil.

Next, by connecting the lead wire 209 and the lead wire 207 to a connector 211, and by connecting the lead wire 204 and the lead wire 206 at a connector 212, two 1.5 turns of coils are connected in parallel. Further, by connecting the lead wire of the coil 107 to the connector 212, 1.5 turns of coil of two lines in parallel and 3 turns of coil are connected in series to form 4.5 turns of coil.

Although one phase of wire connection has been described above, the same kind of wire connection is carried out with respect to the other five phases to form 4.5 turns of coil in which 1.5 turns of coil of two lines in parallel and 3 turns of coil are connected in series.

Figure 5:
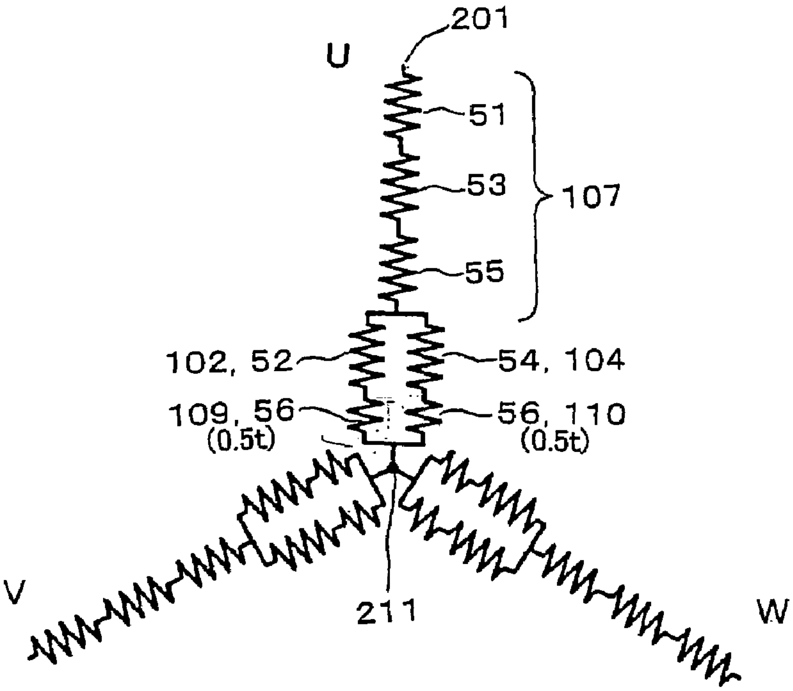
FIG. 5 is a circuit diagram showing an example of the wire connection of U phase, V phase and W phase according to the first embodiment.

Terminals of 4.5 turns of coil are constructed of the lead wire 201 and the connector 211. By connecting either the lead wire 210 or the connector 211 to the other two phases of 4.5 turns of coils, it is possible to fabricate, for example, a pair of Y-connection coils in which electrical angles are shifted to each other by 60° as shown in FIG. 5, or, for example, a pair of Δ-connection coils in which electrical angles are shifted by 60°, not shown. In addition, with reference to FIG. 5, a V-phase and W-phase are constructed in the same manner as the U-phase.

According to the first embodiment, the sixth conductor 56 is half split to make a set of 0.5 turns, thereby forming a non-integral number of coil of 4.5 turns. However, a set of sixth conductors 56 having been quadrisected are connected in parallel-to form 0.25 turns of coil, thereby enabling to fabricate a non-integral number of coil of 4.25 turns. Furthermore, for example, it is also possible that the sixth conductor 56 is divided, and a part of the divided sixth conductor 56 is taken as a group of a non-integral number of turns.

Figure 6:
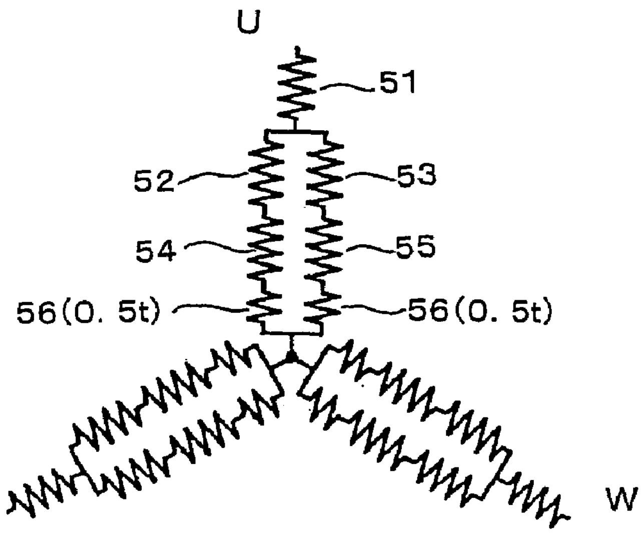
FIG. 6 is a circuit diagram showing another example of the wire connection of U phase, V phase and W phase according to the first embodiment.

According to the first embodiment, as described above, the first conductor 51, the third conductor 53, and the fifth conductor 55 are connected in series to form 3 turns of coil; 1.5 turns of coil formed by connecting the second conductor 52 and one of a pair of 0.5 turns of the sixth conductors, and 1.5 turns of coil formed by connecting the fourth conductor 54 and the remaining of a pair of 0.5 turns of sixth conductors in series are connected in parallel to form 1.5 turns of coil; and this 1.5 turns of coil is connected in series to the foregoing 3 turns of coil, thereby fabricating 4.5 turns of coil. It is also preferable that, as shown in FIG. 6, the third conductor 53, the fifth conductor 55, and one of a pair of 0.5 turns of the sixth conductors 56 are connected in series to form 2.5 turns of coil; the second conductor 52, the fourth conductor 54, and the remaining of a pair of 0.5 turns of the sixth conductors 56 are connected in series to form 2.5 turns of coil; and these two 2.5 turns of coils are connected in parallel, and these 2.5 turns of coils having been connected in parallel are connected to the first conductor 51, thereby enabling to construct 3.5 turns of coil as well. In addition, with reference to FIG. 6, V-phase and W-phase are constructed in the same manner as the U-phase.

Further, although not shown, it is also preferable to make a Δ-connection of 3 turns of coils by connecting the first conductor 51, third conductor 53 and fifth conductor 55 in series, and to make the wire connection of coils by connecting in parallel a group of 1.5 turns of coil with the second conductor 52 and one of the divided sixth conductors 56 and a group of 1.5 turns of coil with the fourth conductor 54 and the remaining of the divided sixth conductors 56.

Furthermore, since there are 6 conductors in one slot and there are 16 slots per phase, the number of positions capable of being divided (a total number of conductors in all slots) is 6×16=96. Accordingly, when plural groups are made with taking an arbitrary number m of conductors out of 96 as a set and these plural groups of coils are connected in parallel, it is possible to obtain a non-integral number of turns of coil having m/S turns (S is the number of slots per phase). For example, in the case of connecting 2 sets of conductors in parallel establishing 8 conductors as a set, m=8 and S=16. Accordingly m/S=0.5, which makes it possible to obtain a non-integral number of turns of coil, including 0.5 turns of coil.

Although an example in which the number of slots per phase is 16, and three pairs of conductors (six conductors) are mounted onto a slot is shown, the invention is not limited to these slot number and conductor number.

Supposing that the number of conductors mounted onto a slot is n (integer) and the number of slots per phase is S, positions capable of being divided (a total number of conductors in all slots) is (S×n). When plural sets are formed by taking an arbitrary number m of conductors out of (S×n) conductors as a set and these plural sets of coils are connected in parallel, it is possible to fabricate a non-integral number of turns of coil having m/S turns.

Further, since the conductors are continuously connected at the coil end portion, when the conductors are circumferentially divided, plural groups of conductors are formed, and these plural groups are connected in parallel, it becomes possible to achieve less lead wires and a smaller number of connection points of lead wires.

When varying a ratio between the number of coils of non-integral turns and the number of coils of integral turns, magnetic properties change as accordingly. However, when establishing the number of non-integral turns of coils and the number of integral turns of coils to be the same, it becomes possible to make magnetic properties on an entire circumference of the stator 1 uniform. Consequently, it is possible to achieve the reduction in noise of an electric rotating machine.

Further, in the case of array winding, the number of turns cannot be varied by the change of the number of conductors in slots. According to this first embodiment, however, since it is possible to easily obtain a non-integral number of turns of coils even in the case of array winding, the stator of an electric rotating machine according to the first embodiment comes to be particularly effective in the case of array winding.

Embodiment 2

In the case where there are coils that are connected in parallel and coils that are not connected in parallel together as shown in the foregoing first embodiment, the coils that are connected in parallel and the coils that are not connected in parallel will be both present in one slot as well.

Figure 7:
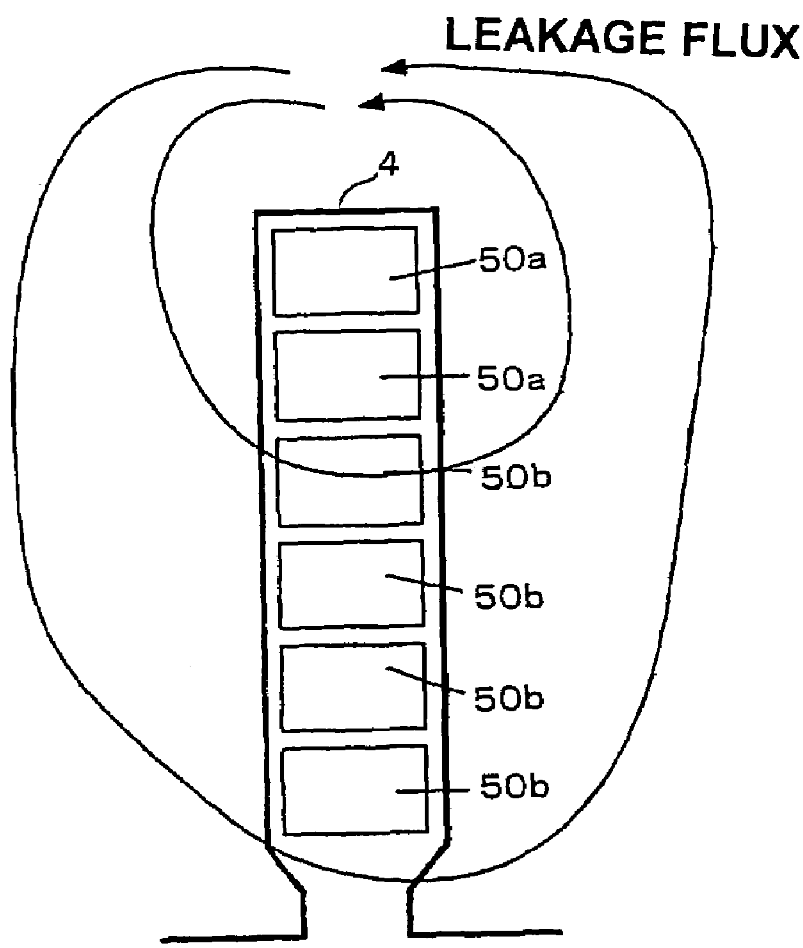
FIG. 7 is a diagram explaining a state of leakage flux in the case where conductors of a coil that are connected in parallel and conductors of a coil that are not connected in parallel are both present in one slot.

FIG. 7 is an explanatory view of the state of leakage flux in the case where coils that are connected in parallel and coils that are not connected in parallel are both present in one slot.

As shown in FIG. 7, the flow of current through conductors in the slot 4 causes leakage flux to be generated in the slot 4 depending on a magnitude of this current. This leakage flux is generated regardless of outputs, resulting in, e.g., iron loss, and adversely affecting output characteristics of a motor.

In the structure shown in FIG. 7, the conductors of the coil 50*s* that are connected in parallel are disposed in such a manner as to be pulled over to the bottom on the inner layer side of the slot 4. In such arrangement, current flowing through the conductors of the coil 50*a* that are connected in parallel is smaller than that flowing through the conductors of the coil 50*b* that are not connected in parallel. Accordingly, the leakage flux of the conductors of the coil 50*s* that are connected in parallel comes to be smaller than the leakage flux of the conductors of the coil 50*b* that are connected in parallel. Further, the leakage inductance at the bottom on the inner layer side of the slot 4 becomes larger than that at the opening on the outer layer side of the slot 4. Accordingly, by locating conductors of the coil 50*a* connected in parallel through which smaller current flows in the bottom on the inner layer side of the slot 4 where leakage inductance comes to be larger, the entire amount of leakage flux will be reduced.

Magnetic flux generated by a rotor gets in from the opening of the slot 4 and is interlinked with the conductors of coil to be a motor output. However, this magnetic flux generates leakage flux in the slot 4 in a like manner to conductors of coil in the slot 4, and flux linkage in the vicinity of the opening of the slot 4 is larger than flux linkage at the bottom on the inner layer side of the slot 4 farthermost from the rotor side. Accordingly, to effectively interlink the magnetic flux of rotor with the conductors of coil, it is desirable to locate conductors of the coil 50*b* that are not connected in parallel in the vicinity of the opening of the slot 4.

Figure 8A:
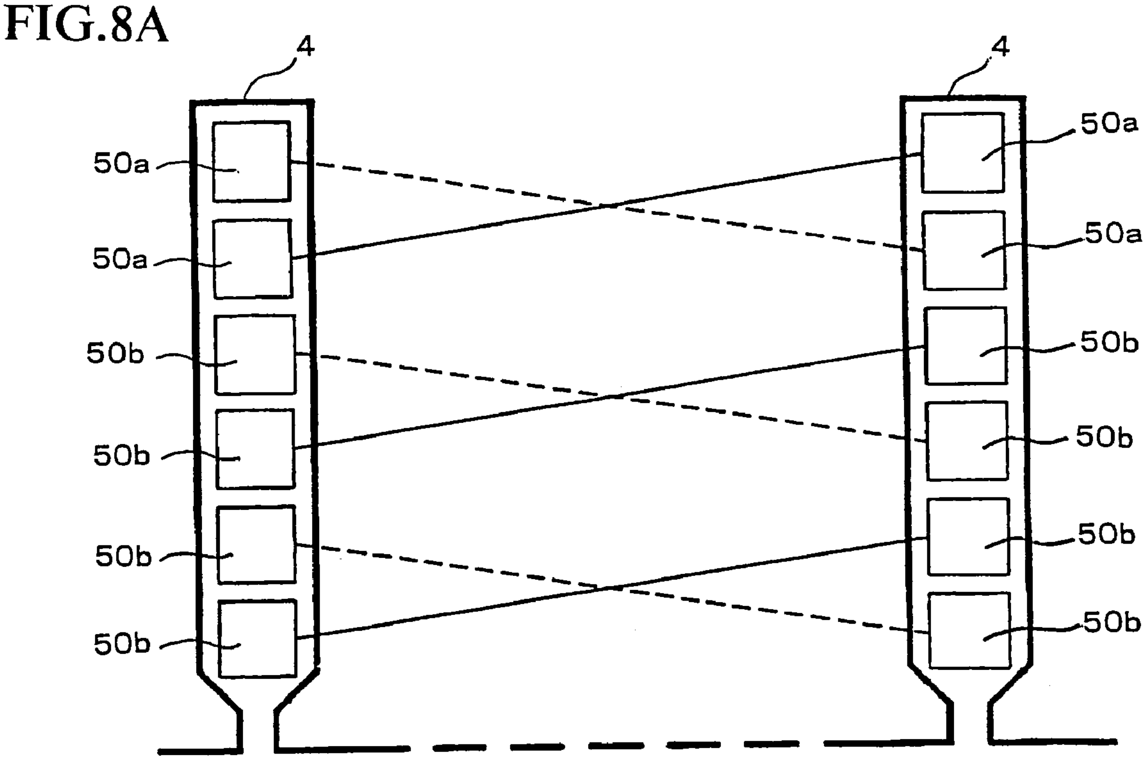
FIGS. 8A and 8B are diagrams showing layout examples of conductors of a coil in the slot.
Figure 8B:
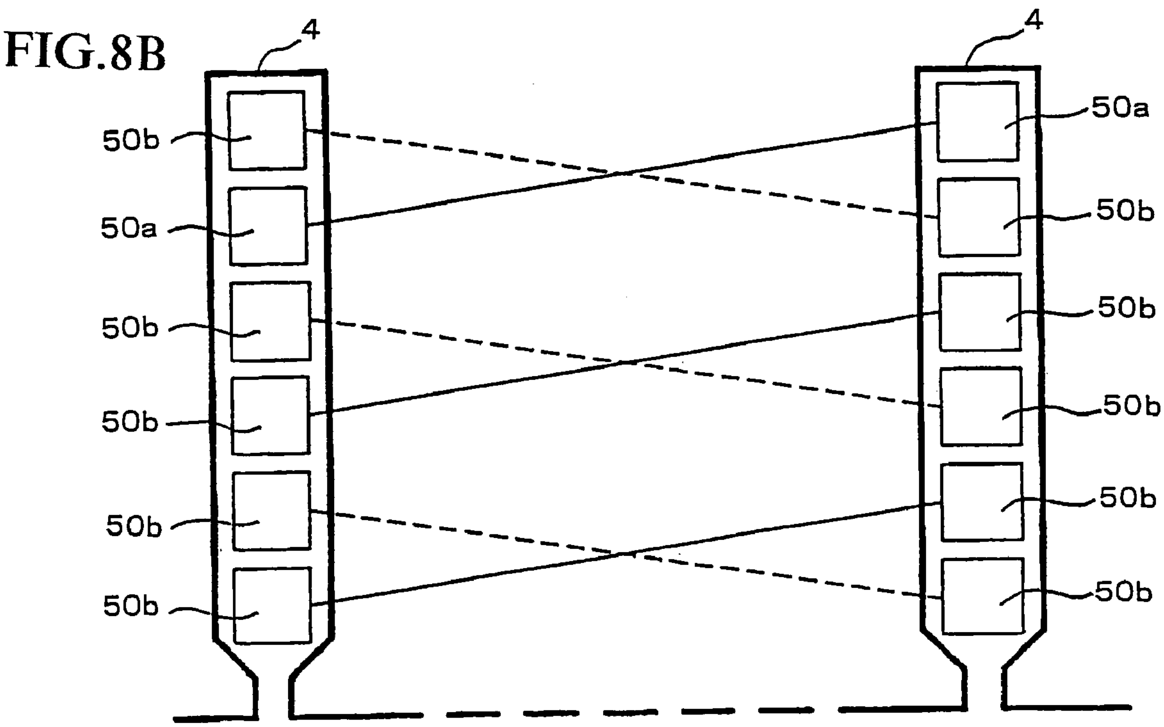

FIGS. 8A and 8B are diagrams each showing a layout example of the conductors of coils 49 in slots. With reference to FIG. 8A, coils 50*a* that are connected in parallel are located in the bottom of the slot. FIG. 8B, as described above, shows the case where conductors are disposed so as to run on the inner layer side and the outer layer side in the bottom of the slot 4 alternately for the purpose of efficiently utilizing a space in the slot.

As described above, by disposing the conductors of the coil 50*a* that are connected in parallel in the bottom on the inner layer side, and by disposing the conductors of the coil 50*b* that are not connected in parallel in the vicinity of the opening, it becomes possible to improve output characteristics of a motor.

Furthermore, current flowing through the coils 50*a* that are connected in parallel is smaller than the current flowing through the coils 50*b* that are not connected in parallel, and therefore it is possible to make a cross section of the conductors of the coil 50*a* smaller than a cross section of the conductors of the coil 50*b*. In the case of making a cross section of the conductors of the coil 50*a* smaller, a cross section of the conductors of the coil 50*b* in the slot can be made larger corresponding to downsizing in cross section of the conductors of the coil 50*a* to cause a resistance of the coil 50*b* to be smaller. In this case, it becomes possible to make a heating value of the entire coils smaller than in the case of mounting conductors of the coil 50*b* having the same cross sections in the slot.

Embodiment 3

Figure 9A:
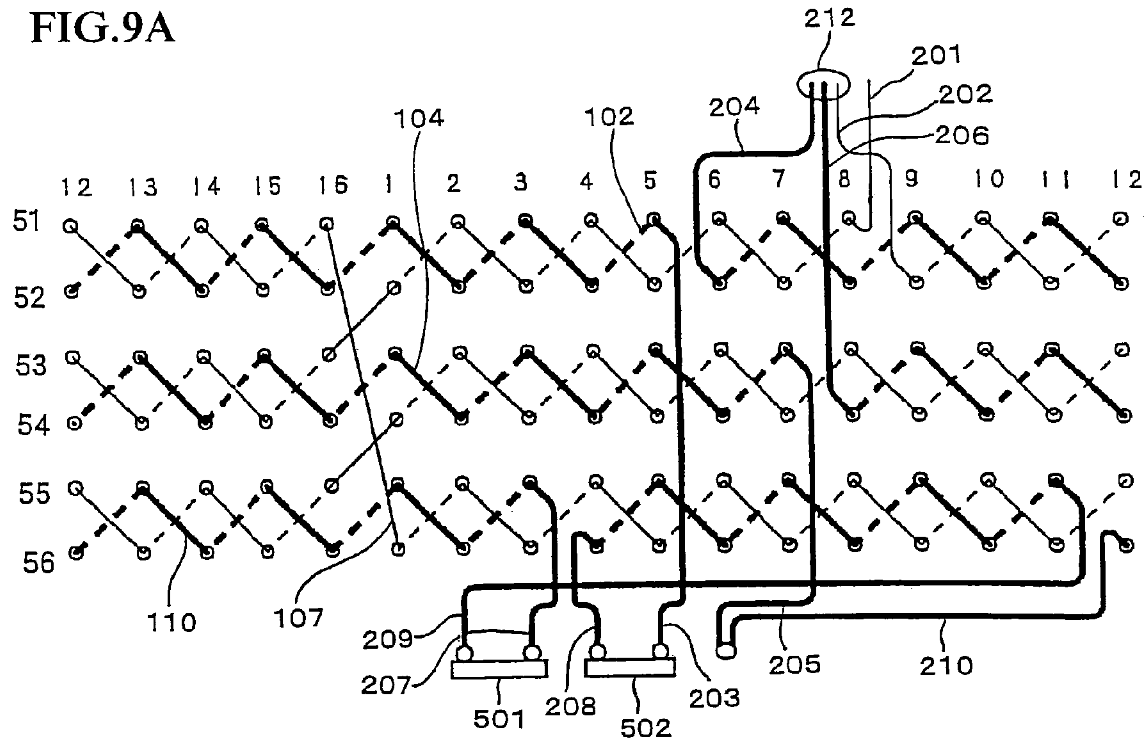
FIGS. 9A and 9B are wire connection diagrams showing examples in which switches are provided at a connector of lead wires of the wire connection diagram shown in FIG. 4.
Figure 9B:
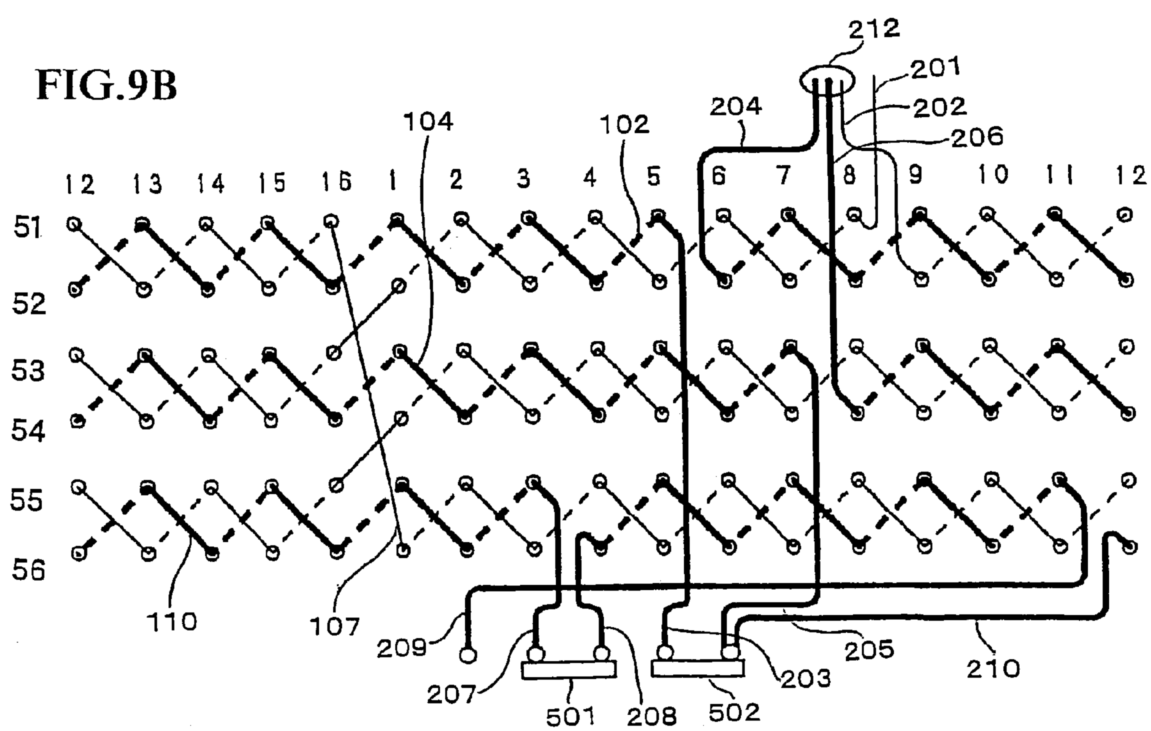

FIGS. 9A and 9B are wire connection diagrams each showing an example in which switches are provided at a connector of lead wires of the wire connection diagram shown in FIG. 4.

With reference to FIG. 9A, with a switch 501 and a switch 502, the same construction as the wire connection state shown in FIG. 4 is arranged. In this construction, the sixth wiring 56 is divided into sets of 0.5 turns, and 4.5 turns of coil are formed. On the other hand, with reference to FIG. 9B, the switch 501 and the switch 502 are made to slide, and terminals at which the sixth wiring 56 is divided are connected to form 1 turn of coil. Furthermore, the second wiring 52 and the fourth wiring 54 are connected in parallel to form 1 turn of coil; and 3 turns of coil consisting of the first wiring 51, the third wiring 53 and the fifth wiring 55, 1 turn of coil of the second wiring 52 and the fourth wiring 54 being connected in parallel, and 1 turn of coil of the sixth wiring 56 are connected in series to form 5 turns of coil. That is, the wire connection can be switched between the construction of 4.5 turns of coil and the construction of 5 turns of coil with the switch 501 and the switch 502.

As described above, by switching the wire connection between the connection in parallel and the connection in series with switches, it is possible to change the number of turns of coil. For example, when setting the number of turns of coil to be 5 turns in the case of a low engine speed, and the number of turns of coil to be 4.5 turns in the case of a high engine speed, it is possible to obtain appropriate states of output characteristics of a motor depending on an engine speed.

The stator-of an electric rotating machine according to the invention can be applied to a stator of, e.g., a vehicle AC generator.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A stator of an electric rotating machine comprising:

a stator iron core having a plurality of slots that extend in an axial direction of an annular member of laminated thin steel plates and that are disposed at a determined pitch circumferentially; and coils forming a U-phase, a V-phase and a W-phase, wherein each of a U-phase, a V-phase, and a W-phase coil is formed by turning back n conductors on an outside of an end face of said stator iron core, and mounting said conductors in said slots at a predetermined slot pitch, the number of slots in each of said U-phase, V-phase, and W-phase is S, and, in each of said U-phase, V-phase, and W-phase, plural sets of m conductors are selected out of (S·n) conductors in all of the slots and are connected in parallel, thereby forming a non-integer m/S turns coil and a non-integer number of turns coil is formed by combining said non-integer m/S turns coil with integer number of turns coils composed of said conductors that are not selected.

2. The stator of an electric rotating machine according to claim 1, wherein a conductor running in a circumferential direction is divided into plural parts, and a part of the conductor divided into plural parts is taken as a group consisting of said m conductors.

3. The stator of an electric rotating machine according to claim 1, wherein a conductor running in a circumferential direction is divided into plural parts, and all of the conductors divided into plural parts are taken as a group consisting of said m conductors.

4. The stator of an electric rotating machine according to claim 1, wherein a cross section of said m conductors is smaller than a cross section of said conductors that are not selected.

5. The stator of an electric rotating machine according to claim 1, wherein said m conductors are disposed on an inner layer side of said slot.

6. The stator of an electric rotating machine according to claim 1, wherein the number of said non-integer m/S turns coils and the number of said integer turns coils are the same.

7. The stator of an electric rotating machine according to claim 1, including a switch changing the number of turns of said non-integer m/S turns coils and said integer turns coils.

* * * * *